UNITED STATES PATENT OFFICE.

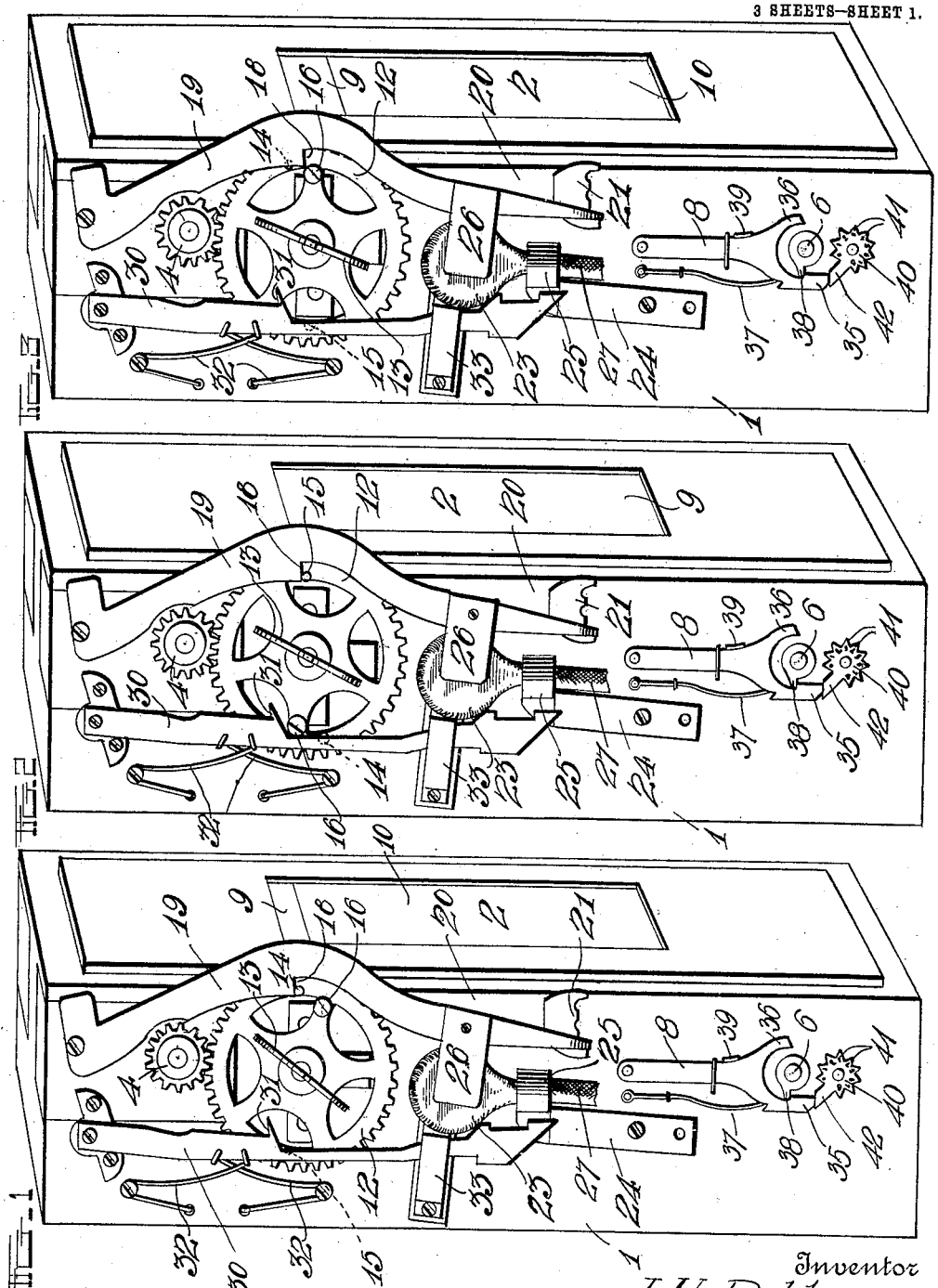

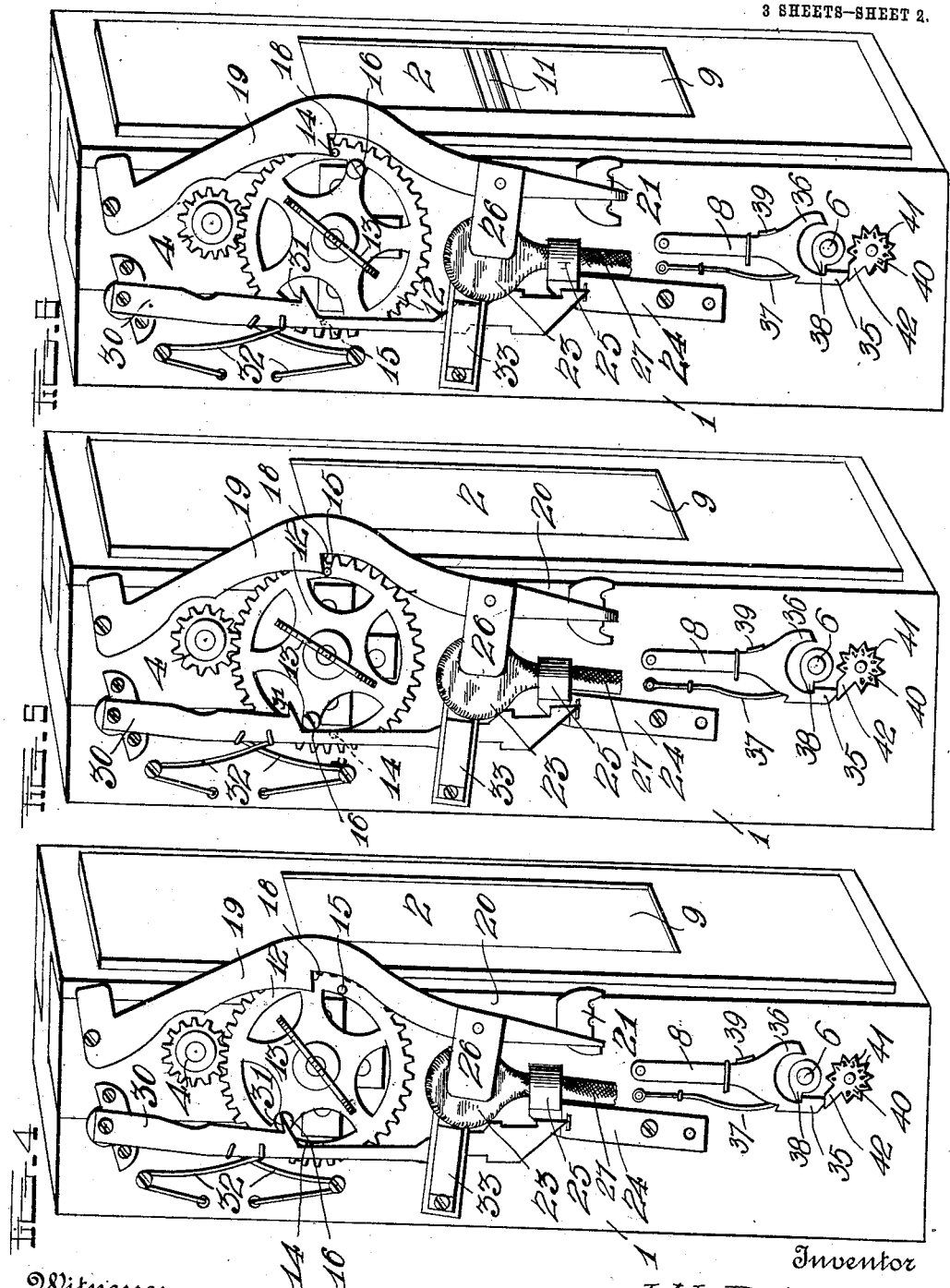

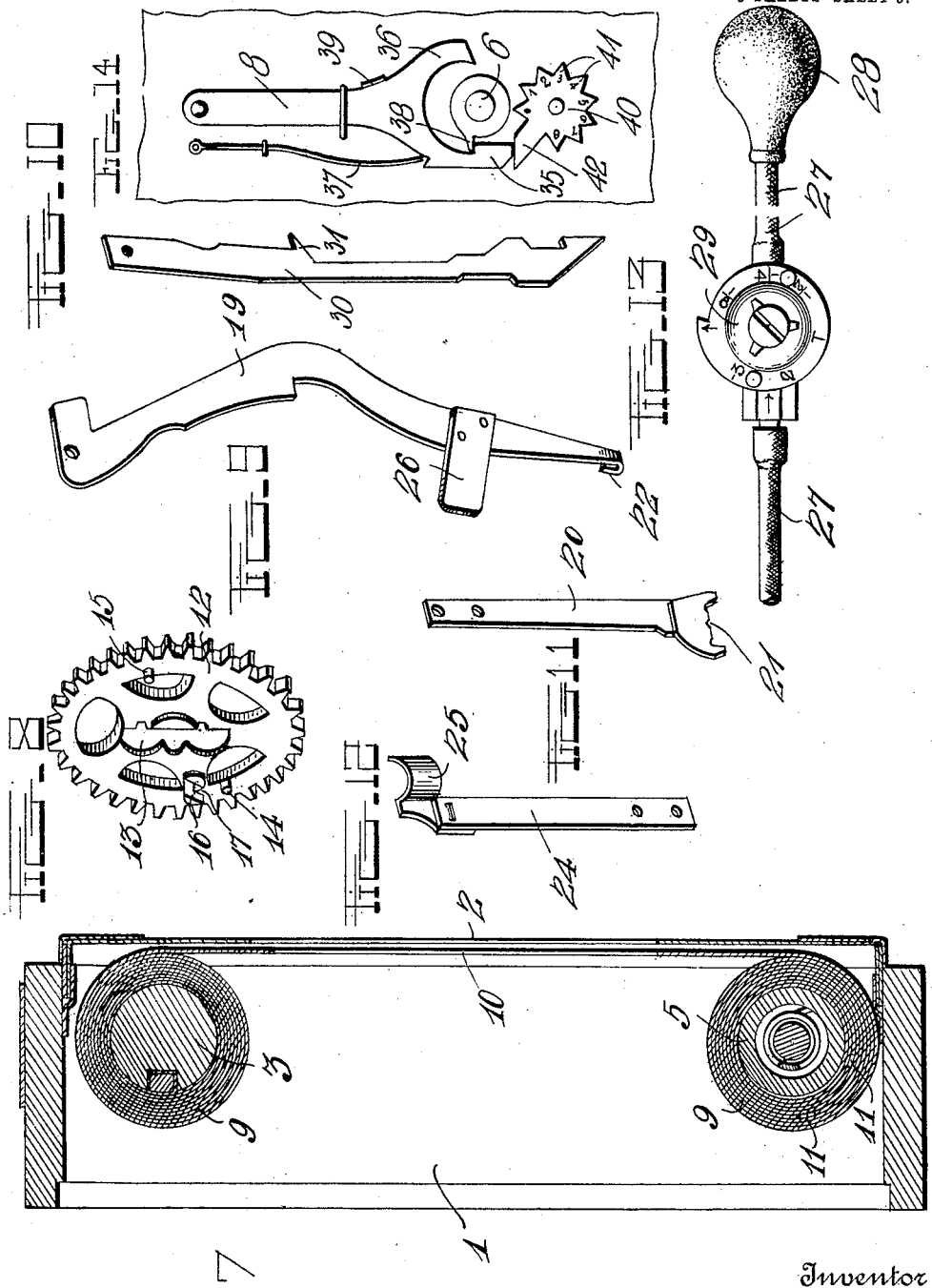

JOSEPH H. POLBERG, OF GLASGOW, MONTANA.

CAMERA-SHUTTER.

992,054.  Specification of Letters Patent.  Patented May 9, 1911.

Application filed July 28, 1910. Serial No. 574,332.

*To all whom it may concern:*

Be it known that I, JOSEPH H. POLBERG, a citizen of the United States, residing at Glasgow, in the county of Valley and State of Montana, have invented certain new and useful Improvements in Camera-Shutters; and I do declare the following to be a full, clear, and exact description of the invention, such as will enable others skilled in the art to which it appertains to make and use the same.

This invention relates to improvements in camera shutters.

One object of the invention is to provide a shutter in the form of a flexible curtain having a spring actuated winding mechanism whereby the same is quickly moved to make various exposures when released by the operating mechanism.

Another object is to provide a camera shutter having an improved construction of operating mechanism whereby various exposures may be accurately timed and effected.

With these and other objects in view, the invention consists of certain novel features of construction, combination and arrangement of parts as will be more fully described and particularly pointed out in the appended claims.

In the accompanying drawings: Figure 1 is a perspective view of the shutter showing the parts arranged and set for focusing; Fig. 2 is a similar view showing the position of the parts when set ready for time or slow exposures; Fig. 3 is a similar view showing the position of the parts while a time exposure is being made through the large opening in the curtain; Fig. 4 is a similar view showing the position of the parts after any exposure has been made; Fig. 5 is a similar view showing the position of the parts when set for a quick exposure; Fig. 6 is a similar view showing the position of the parts when an instantaneous exposure is being made through the small opening in the curtain; Fig. 7 is a vertical sectional view of the shutter; Fig. 8 is a detail perspective view of the shutter stopping and holding gear; Fig. 9 is a similar view of the gear releasing lever; Fig. 10 is a similar view of the locking lever for the shutter stopping gear; Fig. 11 is a similar view of the retracting spring for the gear releasing lever; Fig. 12 is a similar view of the holding spring for the pneumatic lever releasing bulb; Fig. 13 is a plan view of the automatic valve for controlling the air in the pneumatic lever releasing bulb. Fig. 14 is an enlarged detail view of the pawl for locking the spring curtain winding roller and the tally whereby the tension of the spring is indicated.

In the embodiment of the invention I provide a suitable box or casing 1 which may be attached to a camera in any suitable manner. In the front side of the casing is formed an exposure opening 2 which may be of any suitable size and shape and is here shown as being rectangular. In the upper portion of the casing is revolubly mounted an upper curtain winding roller 3 the shank or journal at one end of which projects through the side of the casing and has fixedly mounted thereon a spur gear pinion 4.

Revolubly mounted in the lower portion of the casing is a spring roller 5 the shaft or journal at one end of which projects through the adjacent end of the casing and has secured thereto a spring winding knob 6 which is adapted to be engaged by a spring projected locking pawl 8 whereby the spring is held against unwinding.

In connection with the locking mechanism I preferably provide a tally, hereinafter described, to indicate the tension of the roller spring.

Connected at its opposite ends to the rollers 3 and 5 is a flexible curtain 9 which forms the shutter. The curtain 9 has formed therein at suitable intervals a large focusing and time exposure opening 10 and one or more narrow quick exposure openings 11 said openings being adapted to be moved across the exposure opening 2 in the front side of the casing by the winding and unwinding of the curtain on the rollers 3 and 5 thus producing the various exposures of the negative plate or film in the camera. The curtain is here shown as being wound on the rollers in such manner as to bring the curtain next to the inner wall of the front side of the casing. It will be understood, however the curtain may be arranged on the rollers in such manner as to bring the curtain next to the ground glass of the camera.

In order to hold the curtain in position for making an exposure or for focusing the camera and to stop the movement of the curtain after the exposure has been made, I provide a suitable stopping and holding mechanism, said mechanism comprising a master gear 12 which is revolubly mounted on a stud shaft secured in the side of the casing in position to permit said gear to engage the pinion 4 on the shaft of the upper winding roller 3. The gear 12 is provided with a suitable thumb piece or handle 13 by means of which the gear may be revolved to turn the pinion 4 in the proper direction for winding the curtain on the upper roller 3 against the tension or pressure of the lower spring roller from which the curtain is unwound. In order to lock the gear 12 after thus winding the curtain on the upper roller, said gear is provided with a pair of stop pins 14 and 15 arranged at diametrically opposite points near the outer edge of the gear as shown. The gear is also provided with a locking lug 16 arranged thereon adjacent the stop pin 14 but slightly nearer the center of the gear said lug being provided in its outer side adjacent the gear with a notch 17 the purpose of which will be hereinafter described.

The stop pins 14 and 15 and the locking lug 16 are adapted to engage a stop shoulder 18 formed on a curved stop lever 19 which is loosely pivoted at its upper end to the outer side of the shutter casing and is disposed adjacent the outer surface of the gear 12 as clearly shown. The lever 19 is normally held back in close engagement with the outer surface of the gear 12 by means of a flat lever retracting spring 20 having on its lower end a notched plate or rack 21 with which the hook shaped lower end 22 of the lever 19 is adjustably engaged.

In order to move the lever 19 outwardly and thus disengage the shoulder 18 from the stop pin engaging the same and permit the spring roller to move the curtain for the purpose of making an exposure, I provide a pneumatic releasing mechanism comprising a small pneumatic bulb or cushion 23 arranged on the side of the casing 1 and held in position for releasing the lever 19 by a spring plate 24 having on its upper end a hook 25 to engage the neck of the bulb or cushion thereby holding the same in position and at the same time permitting said bulb to be readily removed for repair or other purposes. The lower end of the lever 19 is provided with a laterally projecting bulb engaging plate 26 which is pressed against the bulb 23 by the retracting spring 20 of the lever as shown. To the pneumatic bulb or cushion 23 is connected one end of a flexible tube 27 provided at its free end with an aperture ball or bulb 28 whereby a charge of air is forced through the tube into the bulb 23 for the purpose of expanding or inflating the same, this expansion or inflation of the bulb forcing the releasing lever outwardly against the pressure of the retracting spring 20 and thereby moving the shoulder 18 of the lever out of or beyond the plane of the stop pin engaged therewith. The gear 12 is thus released and the spring roller permitted to wind the curtain thereon from the upper roller.

Arranged at a suitable point in the flexible tube 27 is a time controlling valve 29 which may be of the usual or any suitable construction and may be set to control the escape of the air forced into the bulb 23 thereby regulating the time taken by the lever to move back to its normal position to bring the shoulder therein into the path of movement of the stop pins on the gear after being forced out by the expansion or inflation of the bulb.

In order to stop and lock the gear 12 when the curtain has moved the required distance for making the exposure, I provide a locking lever 30 which is pivotally connected at its upper end to the side of the casing and has formed thereon a hook 31 which is adapted to be engaged by the stop lug 16 on the gear 12 when the latter has moved around the required distance. The lever 30 is forced over and the hook 31 held yieldingly in the path 16 by a suitable spring 32 which is arranged on the casing and engaged with the lever as shown. The hook 31 is beveled on its lower edge so that when the gear 12 is turned to wind the curtain on the upper roller, the lug 16 will engage the beveled lower edge of the hook thereby forcing the lever 30 back against the tension of the spring 32 and permitting the lug to pass by the hook. When, however, the lug is brought around by the gear as the latter is turned in the opposite direction, said lug will engage the square side of the hook 31 and thus lock the gear against further rotary movement in this direction. The lower end of the lever 30 projects through and loosely engages a guard 33 secured to the side of the casing as shown.

In the operation of the device, when it is desired to focus the camera for a time exposure the gear 12 is turned to revolve the upper roller in the proper direction for winding the curtain thereon until the large exposure opening 10 is brought opposite the exposure opening 2 in the front of the casing at which time the stop pin 14 will engage the shoulder 18 in the lever 19 so that the curtain will be held in this position against the tension of the lower spring roller. After the camera has been focused the gear is turned one half a revolution to wind the curtain on the said roller until the exposure opening in the curtain has been wound onto the roller and out of alinement with the exposure opening in the casing, at which time the stop pin 15 will have been brought around into engagement with the shoulder 18 in the lever 19 whereby the gear will be held against retrograde movement as clearly shown in Fig. 2 of the drawing. The operating mechanism is now in position to be released to permit the lower spring roller to wind the curtain thereon and unwind the same from the upper roller thereby bringing the large exposure opening again into alinement with the exposure opening in the casing. In order to release the parts to permit this retrograde movement of the curtain, the ball or bulb 28 at the end of the tube 27 is compressed thus forcing a charge of air into the bulb 23 at the inner end of the tube thus inflating said bulb which will move the lever 19 outwardly and disengage the shoulder 18 from the pin 15 on the gear which will permit the gear to revolve and the curtain to be drawn downwardly in the manner described. In thus making a time exposure, the air controlling valve 29 will be first set so that the charge of air forced into the bulb 23 will be retained therein for the required period of time thus keeping the bulb inflated and the lever 19 held out of the plane of the pins 14 and 15. The lever, however, when thus moved out will be in position to cause the shoulder 18 therein to be engaged by the outer portion of the locking lug 16 when the latter is brought around by the retrograde movement of the gear as shown in Fig. 3 of the drawing, thus arresting the movement of the gear after a half revolution with the opening in the curtain in alinement with the opening in the casing. The movement of the gear and the curtain will be arrested as long as the bulb 23 remains inflated and the lever thereby held out and just so long will the large exposure opening in the curtain remain in alinement with the exposure opening in the casing. As soon as the air has escaped through the air valve 29 and thus permitted the bulb 23 to contract, the retracting spring 20 will draw the lever back toward the side of the casing until the shoulder 18 is brought opposite to the notch 17 in the locking lug whereupon said lug will be released and the gear again rotated under the influence of the spring roller until the lug comes into engagement with the hook 31 in the locking lever as clearly shown in Fig. 4 of the drawing. This further movement of the gear permits the lower winding roller to wind the curtain thereon and draw the exposure opening in the curtain downwardly past the exposure opening in the casing thereby closing the latter.

When it is desired to make an instantaneous exposure, the curtain is wound on the upper roller in the manner described until the desired exposure opening in the curtain has been brought above the exposure opening in the casing at which time the operating mechanism will be in the position shown in Fig. 5 of the drawings with the stop pin 15 in engagement with the shoulder 18 in the lever 19. With the parts in this position, air is forced into the releasing bulb 23 through the air controlling valve in the manner described which will inflate said releasing bulb and thus disengage the lever from the pin 15 whereupon the gear will revolve until stopped by the engagement of the stop lug 16 with the hook 31 on the stop lever 30. During this movement of the gear the curtain has been pulled down and wound on the lower roller thereby bringing the exposure opening in the curtain quickly across the exposure opening in the casing and making the quick exposure. Before turning the gear for making the quick exposure, the stop lever will be swung forwardly and the hooked lower end thereof engaged with the intermediate notch in the adjusting plate 21 by which arrangement the shoulder in the lever will be moved farther from the center of the gear so that the locking lug 16 will clear the shoulder. By permitting the locking lug 16 to pass the shoulder of the stop lever, the gear will make nearly a complete revolution and will not be stopped until the stop lug 16 has been brought around into engagement with the hook 31 on the locking lever 30. When arranging the parts for making a quick or short time exposure, the air controlling valve 29 is arranged to permit the quick releasing of the air after being forced into the stop bulb 23, thereby permitting the releasing lever to be instantly retracted by the retracting spring 21 and preventing the shoulder 18 in the lever from remaining in engagement with the outer portion of the stop lug as in the case of a long exposure, the notch 17 in said lug permitting the same to clear the shoulder in the stop lever and to move on with the gear until caught by the hook 31 on the locking lever as previously described.

The pawl 8 for locking the spring curtain winding roller 5 and the tally for indicating the tension of the spring roller which has been hereinbefore referred to are described as follows: The pawl 8 and the tally may be arranged on either side of the shutter box or casing and in connection with either end of the spring roller shaft. The pawl is pivotally connected at its upper end to the casing and has a bifurcated lower end comprising a catch finger 35 and a stop finger 36. Engaged with the pawl 8 is a spring 37 which normally forces the pawl over into a position wherein the catch 35 will engage a stop lug or tooth 38 formed on the winding knob 6 of the spring roller shaft whereby said shaft is locked and the spring securely held against unwinding. On the opposite side of the pawl from the spring 37 is arranged a push lug 39 which is adapted to be engaged by the thumb or finger of the operator and the pawl 8 pushed laterally against the tension of the spring to disengage the catch 35 from the tooth 38 thereby releasing the spring roller shaft and allowing the spring to unwind. When the pawl has thus been moved laterally to release the catch 35 from the tooth 38 the stop finger 36 of the pawl will be brought into the path of movement of the tooth 38 so that the latter when the shaft is released will engage said stop finger and thereby permit the shaft to make only a half revolution. After the shaft has thus made a half revolution the pawl is released by the operator and the spring 37 permitted to push the pawl back thus disengaging the stop finger 36 from the tooth 38 which will allow the shaft to again turn until the tooth 38 again comes into engagement with the catch 35 which will complete one revolution of the shaft. It will thus be seen that by means of the pawl the shaft is permitted to revolve only one half revolution at a time which will positively prevent all danger of the spring suddenly unwinding. It will be noted that the tooth 38 on the knob is so constructed that the latter may be readily turned to wind up the spring to the desired tension, said tooth pushing the pawl back against the tension of the spring 37 each time the tooth is brought around into engagement with the catch finger of the pawl.

In order to indicate the tension of the spring of the winding roller so that the speed of the curtain wound thereon may be known, I provide a tally which is adapted to be engaged and turned by the pawl 38 on the knob of the winding roller shaft each time said knob is turned in either direction so that the number of times the shaft has been revolved after the spring has been wound to a certain tension will be indicated, thus showing at a glance the tension of the spring above its normal operating pressure. The tally comprises a disk 40 which is pivotally secured to the side of the curtain box or casing immediately below and adjacent the knob 6 on the end of the winding roller shaft. The disk 40 has formed thereon an annular series of radially projecting V-shaped teeth 41 of which there may be any desired number, said teeth being numbered consecutively as shown. Between the first and last tooth on the disk is arranged a stop lug 42 which prevents the tally from being turned too far in either direction. The teeth 41 of the tally are arranged in position to be engaged by the tooth 38 on the knob 6 whereby when said knob is turned in a proper direction for winding the spring the tooth 38 will engage the teeth of the disk and will turn the tally in the proper direction for indicating the number of times the spring winding shaft has been revolved, said tally being turned to the distance of one tooth for each revolution of the shaft and any consequent tightening of the spring. It will be understood that the spring has in the beginning been wound to the proper tension for operating the shutter at the ordinary or any predetermined speed, and that when this tension has been acquired the tally will be set so that in the subsequent turning of the shaft or tightening of the spring, the tally will be moved to the distance of one tooth. As the teeth are consecutively numbered it may be readily seen at a glance how many additional turns have been given to the shaft and the consequent additional tension imparted to the spring. From this additional tightening of the spring it will be known, from previous experiments, how fast the shutter will be thereby operated. After the spring has been thus wound a certain number of times to increase its tension if it should be desired to decrease the tension to lessen the speed of the shutter the pawl will be operated in the manner described to permit a retrograde movement of the winding shaft the desired number of times to reduce the tension of the spring to the desired point, which will be indicated by the tally, the latter having been turned backward by the reverse movement of the pawl 38 and knob 6.

From the foregoing description taken in connection with the accompanying drawings the construction and operation of the invention will be readily understood without requiring a more extended explanation.

Various changes in the form, proportion and the minor details of construction may be resorted to without departing from the principle or sacrificing any of the advantages of this invention as defined in the appended claims.

What I claim as new is:—

1. In a camera shutter, the combination of a pair of rollers, means for actuating said rollers, a curtain carried by said rollers, a master gear connected with one of the rollers, diametrically opposite stop pins on said gear, a notched stop lug on the gear adjacent one of the stop pins but nearer the center of the gear, a stop lever pivotally mounted adjacent one side of the gear and having a shoulder projecting normally into the path of said pins and lug, means for moving said lever laterally to release it from engagement with the said lug or said pins, a locking lever at the opposite side of the master gear having a hook projecting normally into the path of the locking lug, and means for adjusting the stop lever to permit it to clear the stop lug.

2. In a camera shutter, a curtain having formed therein exposure openings of different sizes, means to operate said curtain, a master gear to hold the curtain against movement, a series of stop pins and a locking lug on said gear, a stop lever having a shoulder adapted to be engaged by said pins and lug whereby the gear and curtain are released and stopped for making exposures, means for moving the lever laterally from the gear to release the stop pins, a spring for retracting said lever to engage the stop pin, said spring having a rack at its lower end engaged by the lower end of the lever, and a locking lever adapted to be engaged by the locking lug on said gear to lock the same against movement after an exposure has been made.

3. In a camera shutter, a casing having formed therein an exposure opening, curtain winding rollers revolubly mounted in said casing, one of said rollers having a spring operating mechanism, a curtain adapted to be wound on and off said roller, said curtain having exposure openings therein, a roller controlling mechanism adapted to be operated to move said curtain, a locking mechanism adapted to control said spring operating mechanism, a pawl on the side of the casing having a bifurcated lower end with a catch at one side and a finger at the opposite side, a spring winding knob between said catch and finger and having a tooth adapted to engage the same, and a notched disk adapted to be engaged and actuated by said tooth.

In testimony whereof I have hereunto set my hand in presence of two subscribing witnesses.

JOSEPH H. POLBERG.

Witnesses:
FRED K. AMUNDSON,
NELSON COTTON.

---

Copies of this patent may be obtained for five cents each, by addressing the "Commissioner of Patents, Washington, D. C."